United States Patent
Hubbard et al.

(10) Patent No.: US 6,415,213 B1
(45) Date of Patent: Jul. 2, 2002

(54) MODEL-BASED CONTROL OF AN AUTOMATIC TRANSMISSION POWER-ON DOWNSHIFT

(75) Inventors: Gregory A Hubbard, Carmel; Jeffrey Kurt Runde, Fishers; Anthony Hubert Heap, Terre Haute, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/574,929

(22) Filed: May 19, 2000

(51) Int. Cl.[7] ............................................... G06F 7/00
(52) U.S. Cl. ...................................................... 701/51
(58) Field of Search ............................ 701/51, 54, 55, 701/56, 58, 67, 68; 192/3.57; 475/43; 477/57, 62, 70, 166, 31, 34

(56) References Cited

U.S. PATENT DOCUMENTS

| | | | | |
|---|---|---|---|---|
| 4,070,927 A | | 1/1978 | Polak | 74/765 |
| 4,653,351 A | | 3/1987 | Downs et al. | 74/866 |
| 4,796,490 A | | 1/1989 | Butts et al. | 74/866 |
| 5,029,494 A | | 7/1991 | Lentz et al. | 74/866 |
| 5,070,747 A | | 12/1991 | Lentz et al. | 74/866 |
| 5,079,970 A | | 1/1992 | Butts et al. | 74/858 |
| 5,601,506 A | | 2/1997 | Long et al. | 475/120 |
| 5,812,957 A | * | 9/1998 | Fizuka | 701/58 |
| 6,029,107 A | * | 2/2000 | Sato | 701/58 |
| 6,205,386 B1 | * | 3/2001 | Stroh et al. | 701/51 |
| 6,216,074 B1 | * | 4/2001 | Hillman et al. | 701/58 |
| 6,243,637 B1 | * | 6/2001 | Minowa et al. | 701/51 |

* cited by examiner

Primary Examiner—Richard M. Camby
(74) Attorney, Agent, or Firm—Leslie C. Hodges

(57) ABSTRACT

An improved control for an automatic transmission power-on downshift, wherein a dynamic model of the transmission is used to schedule the on-coming and off-going clutch pressures based on the transmission input torque and a desired trajectory of the input shaft during the shift. The shift is initiated with the off-going clutch by using the dynamic model achieve consistent initiation of clutch slippage, and to conform the input speed to the desired trajectory. When the input speed nears a synchronization speed for the target speed ratio, the dynamic model is used to engage the on-coming clutch at a rate based on the input torque while maintaining the input speed in synchronism with the target speed ratio. As a result, the control responds appropriately to dynamic changes in input torque, the input speed more accurately tracks the desired trajectory, and the shifts are completed at or near synchronism. Additionally, scheduling the clutch pressures based on the dynamic model achieves more consistent shift feel and improved adaptability to different powertrain and vehicle-type configurations while reducing the number of calibrated parameters requiring adaptive correction.

10 Claims, 3 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

MODEL-BASED CONTROL OF AN AUTOMATIC TRANSMISSION POWER-ON DOWNSHIFT

TECHNICAL FIELD

This invention relates to a shift control for an automatic transmission, and more particularly to a model-based clutch pressure control for carrying out a power-on downshift.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset. Shifting from a currently established speed ratio to a new speed ratio involves, in most cases, disengaging a clutch (off-going clutch) associated with the current speed ratio and engaging a clutch (on-coming clutch) associated with the new speed ratio.

Various techniques have been used for electronically controlling the on-coming and off-going clutches during a power-on downshift. For example, the U.S. Pat. Nos. 5,029,494 and 5,070,747 to Lentz et al. disclose a downshift control in which the on-coming clutch is filled in preparation for engagement, while the off-going clutch is controlled in a series of steps including (1) progressively releasing the off-going pressure until the off-going clutch begins to slip, (2) controlling the off-going pressure to achieve a desired input speed profile, and (3) controlling the off-going pressure to hold the input speed substantially at the post-shift speed; and thereafter, engaging the on-coming clutch and dis-engaging the off-going clutch. Similar control techniques are also described in the U.S. Pat. No. 4,653,351 to Downs et al., the U.S. Pat. Nos. 4,796,490 and 5,079,970 to Butts et al.

The above-described controls tend to involve numerous calibrated parameters requiring adaptive adjustment to compensate for variations, and have a relatively limited ability to react to changes in input torque during the shift. In practice, a margin of safety is frequently provided by intentionally overlapping the on-coming and off-going clutches to some degree, at the expense of clutch heating and shift quality.

SUMMARY OF THE INVENTION

The present invention is directed to an improved control for an automatic transmission power-on downshift, wherein a dynamic model of the transmission is used to schedule the on-coming and off-going clutch pressures based on the transmission input torque and a desired trajectory of the input shaft during the shift. The shift is initiated with the off-going clutch by using the dynamic model to achieve consistent initiation of clutch slippage, and to conform the input speed to the desired trajectory. When the input speed nears a synchronization speed for the target speed ratio, the dynamic model is used to engage the on-coming clutch at a rate based on the input torque while maintaining the input speed in synchronism with the target speed ratio. As a result, the control responds appropriately to dynamic changes in input torque, the input speed more accurately tracks the desired trajectory, and the shifts are completed at or near synchronism. Additionally, scheduling the clutch pressures based on the dynamic model achieves more consistent shift feel and improved adaptability to different powertrain and vehicle-type configurations while reducing the number of calibrated parameters requiring adaptive correction.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
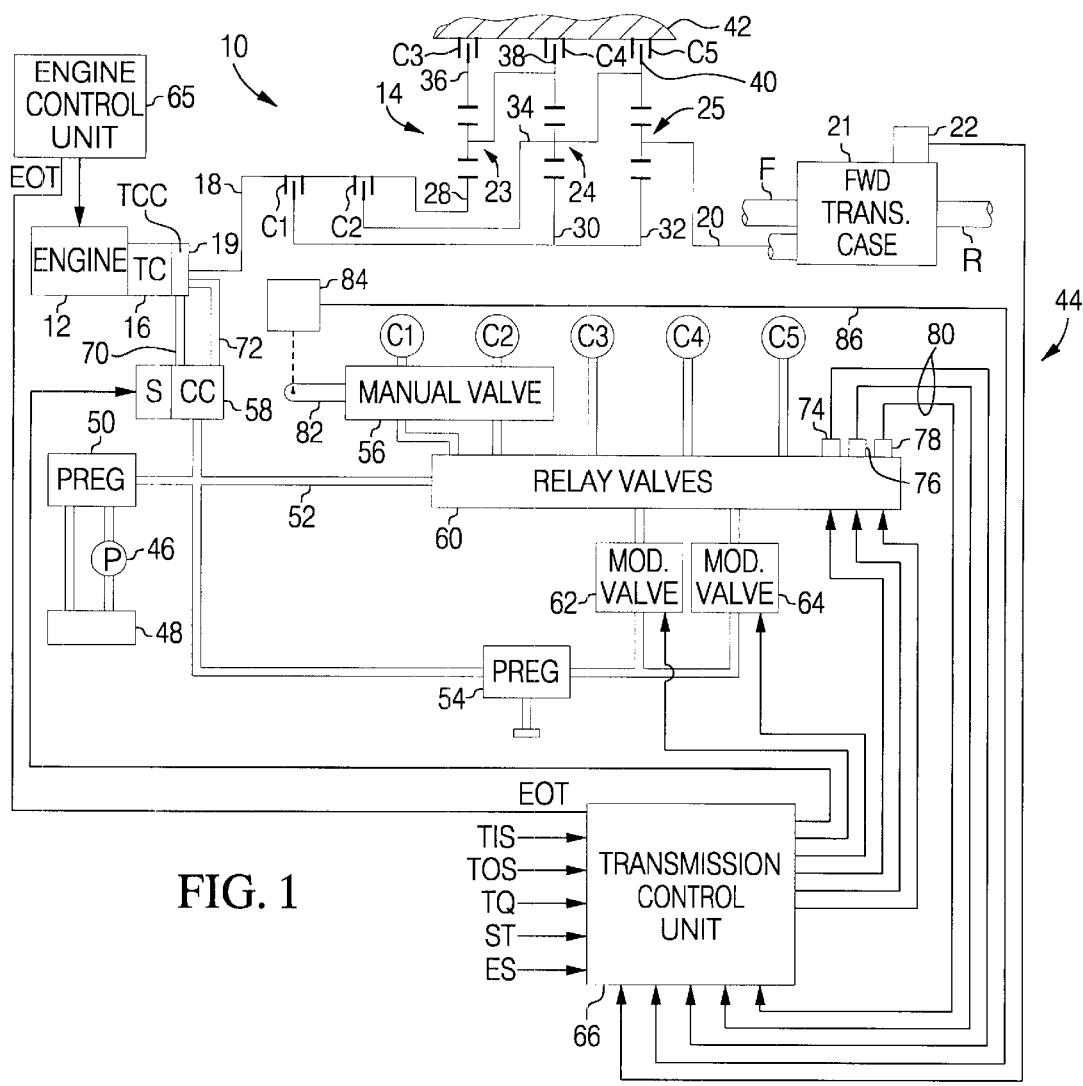
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one speed forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, a driver torque command TQ, and the transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch, develops corresponding force motor current commands, and then supplies current to the respective force motors in accordance with the current commands.

In a power-on downshift, the transmission speed ratio (TIS/TOS) is increased, which requires that the engine 12 accelerate the transmission input shaft 18 from a pre-shift speed defined by the product (TOS*SRold) to a synchronization speed defined by the product (TOS*SRnew), where SRold is the old or current speed ratio, and SRnew is the new or desired speed ratio. In general, this can be achieved by controllably releasing the off-going clutch pressure while preparing the on-coming clutch for engagement, and then releasing the off-going clutch as the on-coming clutch engages. Indeed, this is the general control premise of the aforementioned U.S. Pat. Nos. 5,029,494, 5,070,747, 4,653, 351, 4,796,490 and 5,079,970. As indicated above however, such controls involve numerous calibrated parameters that must be adaptively adjusted, and have a relatively limited ability to react to changes in input torque during the shift. The present invention, on the other hand utilizes a dynamic model of the transmission that takes into account dynamic variations in input torque, and that provides improved and more consistent shift quality with less reliance on extensive adaptive correction.

Figure 3:
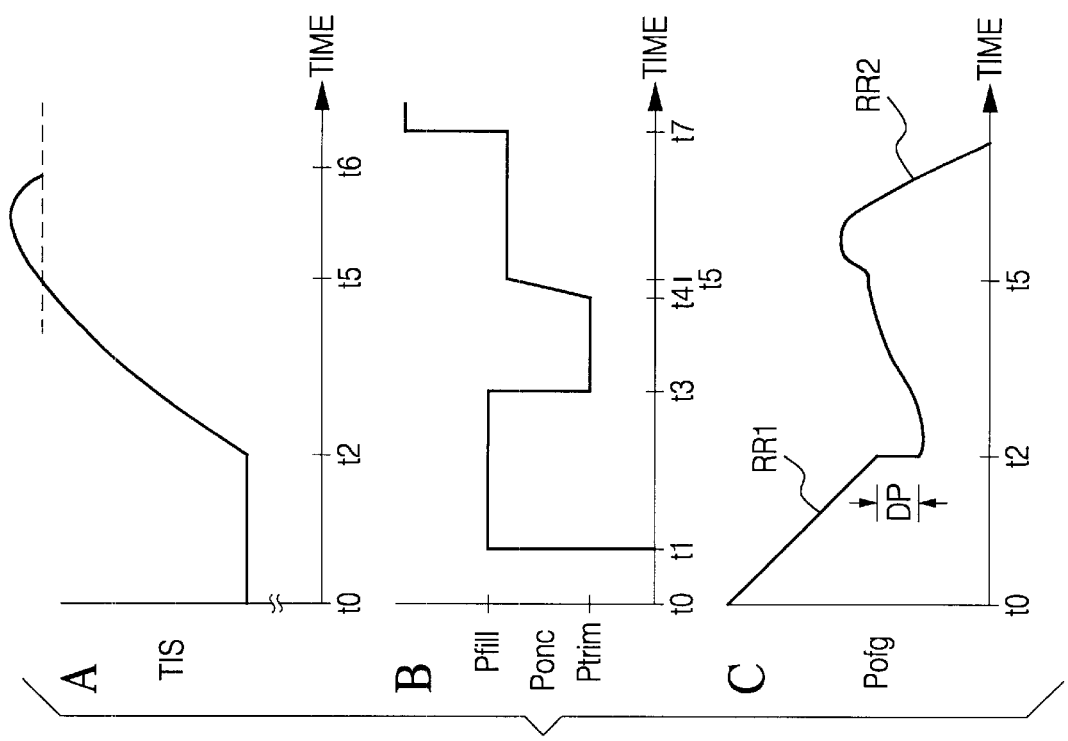
FIGS. 3 and 4 graphically depict power-on downshifts carried out according to this invention. In each figure, Graph A depicts the transmission input speed, Graph B depicts the on-coming clutch pressure, and Graph C depicts the off-going clutch pressure.
Figure 4:
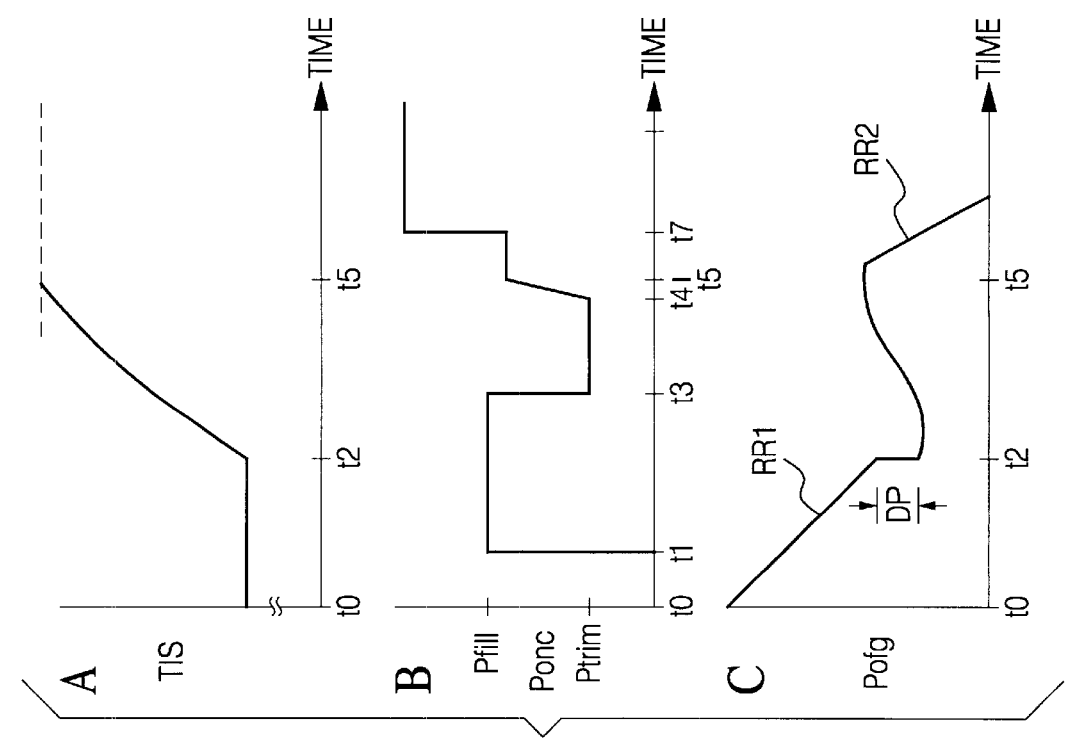

FIGS. 3–4 graphically illustrate a power-on downshift carried out according to this invention. In each figure, Graphs A–C respectively depict the transmission input speed TIS, the on-coming clutch pressure command Ponc, and the off-going clutch pressure command Pofg. As explained below, FIG. 3 represents a shift with ideal timing, and FIG. 4 represents a shift with input speed flare.

In general, the shift is initiated by progressively reducing Pofg, resulting in off-going clutch slippage at time t2. At such point, Pofg is adjusted to a new level and then controlled to allow the engine to raise the input speed TIS at a desired rate to a synchronization speed (SYNC) defined by the product of the new speed ratio (SRnew) and the output speed TOS. Meanwhile, the Ponc is controlled so that the on-coming clutch will be ready for engagement when TIS nears SYNC at time t4. The time t4 may be defined in terms of a predetermined on-coming clutch slip (that is, SYNC–TIS), but is preferably defined in terms of a predicted time until TIS reaches SYNC, based on measured input acceleration and on-coming clutch slip. In the ensuing interval t4–t7, Ponc and Pofg are controlled to maintain TIS at or near SYNC, and the shift is completed at time t7 by fully engaging the on-coming clutch and fully disengaging the off-going clutch.

On a more detailed level, the off-going pressure control is designed to initiate off-going clutch slip (SLIPofg) a given time Tofg_slip(des) after shift initiation. This is achieved by ramping Pofg downward at a ramp rate RR1 so that its value at the conclusion of the interval Tofg_slip(des)—that is, at time t2—produces a torque capacity corresponding to the minimum reaction torque (TQofg_reaction) required to hold the off-going clutch without slipping. This reaction torque may be computed as a pressure Pofg_reaction according to the expression:

$$Pofg\_reaction = Kcl * Klv * TQin \quad (1)$$

where Kcl is pressure-to-torque gain of the off-going clutch, Klv is the leverage gain corresponding to the old or current speed ratio, and TQin is the transmission input torque. The input torque TQin is subject to variation during the shift, and may be computed based on the engine output torque EOT and the torque ratio TR of torque converter 19. The ramp rate RR1 is set by calibration, and Pofg during the interval t0–t2 is subject to adaptive adjustment based on a detected deviation between the time Tofg_slip(des) and the time when off-going clutch slip actually occurs. Thus, the off-going pressure in the interval t0–t2 is given by the equation:

$$Pofg=Pofg\_reaction+(RR1*t)+Pofg\_adaptive \quad (2)$$

where Pofg_adaptive is the adaptive correction, and t is the accumulated time ramping at the rate RR1.

Once the off-going clutch begins to slip, the off-going pressure is controlled so that the input speed will rise toward the SYNC speed at a desired rate, referred to herein as TIS_DOT(des). This control involves the combination of a feed-forward component based on the dynamic model of the transmission, and a feed-back component based on a detected input speed error. The dynamic model of the transmission during this phase of the control comprehends the inertial effects of the engine and transmission, and is given according to the equation:

$$Pofg\_accel=Kcl[(Klv*TQin)+(Kin*TIS\_DOT(des))+(Keng*ES\_DOT(des))] \quad (3)$$

where Pofg_accel is the off-going pressure required to accelerate the input shaft at the desired acceleration TIS_DOT(des), ES_DOT(des) is the engine acceleration corresponding to TIS_DOT(des), Kin is an inertia coefficient for the input shaft 18, and Keng is an inertia coefficient for the engine 12. The coefficients Kin and Keng are negative in sign, reflecting the fact that an increase in TIS_DOT(des) necessitates a decrease in Pofg_accel.

Although the off-going clutch will theoretically begin slipping at time t2 when Pofg falls to the computed value of Pofg_reaction, slipping may actually begin slightly before or after time t2 due to modeling inaccuracies of equation (1). Regardless of such inaccuracies, it is certain that the offgoing clutch reaction torque TQofg_reaction is in equilibrium with the input torque TQin at the instant of off-going clutch slippage. Accordingly, the off-going clutch pressure for input acceleration control is adjusted relative to the modeled off-going pressure when slip is detected. Such pressure is designated as Pofg_at_slip, and is determined as follows:

$$Pofg\_at\_slip=Pofg\_accel(at\ slip)+Pofg\_hyd\_delay \quad (4)$$

where Pofg_accel(at slip) is the value of Pofg_accel (equation 3) when the off-going clutch begins to slip, and Pofg_hyd_delay is a pressure offset due to the hydraulic response delay of the off-going clutch. The hydraulic response delay HD is calibrated for any given clutch, and the term Pofg_hyd_delay is given according to the product (HD*RR1), where RR1 is the off-going pressure ramp rate prior to off-going slip detection. Thus, when off-going clutch slippage is detected, the off-going pressure Pofg is changed by a value ΔP determined according to the equation:

$$\Delta P=Pofg\_reaction-Pofg\_accel(at\ slip)-(HD*RR1) \quad (5)$$

The pressure change may be made in a single step as illustrated in FIG. 3, or may be made in a series of smaller steps if desired. Thereafter, the off-going pressure Pofg is repeatedly computed in the interval t2–t5 according to the equation:

$$Pofg(new)=Pofg(old)+Pofg\_accel(new)-Pofg\_accel(at\ slip)+(K*SPD\_ERR) \quad (6)$$

where Pofg(old) is the previous off-going pressure command, Pofg_accel(new) is the evaluation of equation (3) based on the current value of input torque TQin, Pofg_accel(at slip) is the evaluation of equation (3) at the initiation of off-going clutch slippage, K is a closed-loop proportional gain constant, and SPD_ERR is the closed-loop speed error between the TIS and a desired input speed corresponding to TIS_DOT(des).

While the off-going clutch pressure is being controlled to initiate and then control off-going clutch slip, the on-coming clutch is prepared for engagement by setting Ponc to a fill pressure Pfill for a predetermined fill interval (t1–t3), and then lowering Ponc to a trim value sufficient to maintain the on-coming clutch in readiness for engagement. In the preferred embodiment, the combined duration of the fill and trim periods (that is, the interval t1–t4) is designed to be substantially constant for a given shift, regardless of the engine speed or torque. Consequently, the on-coming pressure control is initiated after a variable fill delay Tdelay (defined by the interval t0–t1 in FIG. 3) computed as follows:

$$Tdelay=Tshift-(Tfill+Ttrim) \quad (7)$$

where Tfill is the fill interval t1–t3, Ttrim is the low pressure trim interval t3–t4, and Tshift is the estimated time required to accelerate the input speed to the synchronization speed SYNC, given the desired acceleration TIS_DOT(des). Thus, Tshift may be given by the equation:

$$Tshift=Tofg\_slip(des)+(SYNC-TIS\_init)/TIS\_DOT(des) \quad (8)$$

where TISinit is the input speed TIS at time t2.

The fill pressure Pfill is typically scheduled as a function of fluid temperature Tsump, and the fill time Tfill for any given clutch is determined according to the product of a calibrated fill time Tcal and a factor F representing the percent of fluid exhausted from the clutch since the last shift involving that clutch. Thus, the factor F accounts for any fluid remaining in the clutch, and is given according to the ratio of the time that the clutch has been exhausted to a calibrated time required to fully exhaust the clutch fluid, not to exceed a value of one. Preferably, Pfill is adaptively adjusted by iterative reduction to ensure that TIS will not significantly exceed SYNC; an adaptive adjustment of this type is disclosed in the aforementioned U.S. Pat. No. 5,070,747, which is incorporated herein by reference. The time Ttrim is calibrated, and the pressure Ptrim may be calibrated or determined through adaptive learning.

When the input speed TIS nears SYNC, the on-coming and off-going clutch pressures are controlled to maintain the input speed at SYNC. The on-coming pressure control is initiated when the estimated time to reach SYNC falls to a predetermined time, represented by the interval t4–t5 in Graph B. As indicated above, the time-to-SYNC may be estimated based on the measured on-coming clutch slip speed (SYNC–TIS) divided by the input shaft acceleration (measured or desired). In the interval t4–t7, the dynamic model of the transmission is used to schedule on-coming pressure based on the input torque TQin and an inertia torque component designed to decelerate TIS in case TIS exceeds SYNC. The model equation for the on-coming synchronization control pressure Ponc_sync is given by:

$$Ponc\_sync=Kcl[(Klv*TQin)+(Kin*TIS\_DOT(sync))+(Keng*ES\_DOT(sync))] \quad (9)$$

where Kcl[(Klv*TQin)] is the input torque dependent component, and Kcl[(Kin*TIS_DOT(sync))+(Keng*ES_DOT(sync))] is the inertia torque component that is used if TIS exceeds SYNC. The terms TIS DOT(sync) and ES_DOT(sync) represent desired input and engine pull-down rates for the case where TIS exceeds SYNC.

The off-going clutch pressure when TIS reaches SYNC at time t5 is a combination of a calibrated open-loop ramp and a closed-loop term that increases the pressure as required to hold TIS at SYNC. Specifically, the pressure is repeatedly computed using the equation:

$$Pofg(\text{new}) = Pofg(sync) - (RR2*Tsync) + (Kp*SLIPonc) + (Ki*\Sigma(SLIPonc)) \qquad (10)$$

where Pofg(sync) is the pressure command value at the beginning of the SYNC control period at time t5, RR2 is the open-loop ramp rate, Tsync is the accumulated time in the SYNC control logic (defined as the current time t minus the SYNC initiation time t5), Kp and Ki are proportional and integral closed-loop gain terms, and SLIPonc is the on-coming clutch slip.

In the shift of FIG. 3, the input speed TIS does not exceed SYNC; accordingly, the on-coming pressure in the interval t5–t7 is based solely on input torque, and the off-going pressure is based solely on the calibrated ramp rate RR2. In the shift of FIG. 4, however, TIS exceeds SYNC; in this case, the inertia torque component of equation (9) raises the on-coming pressure to drive TIS back to SYNC at the calibrated rate TIS_DOT(sync), and the closed-loop components (proportional and integral) of equation (10) raise the off-going pressure in relation to SLIPonc, driving TIS back to SYNC at time t6. In either case, the shift is completed at time t7 when TIS is substantially equal to SYNC for a calibrated period of time.

Figure 5:
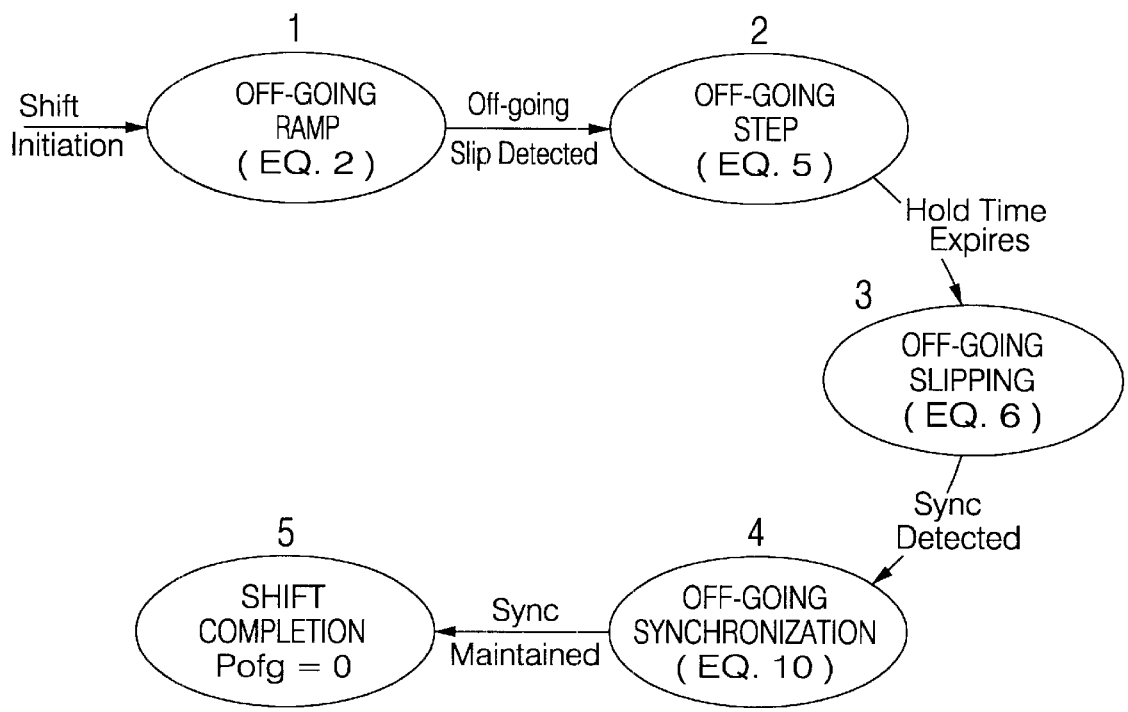
FIG. 5 is a state diagram illustrating an off-going clutch pressure control according to this invention.
Figure 6:
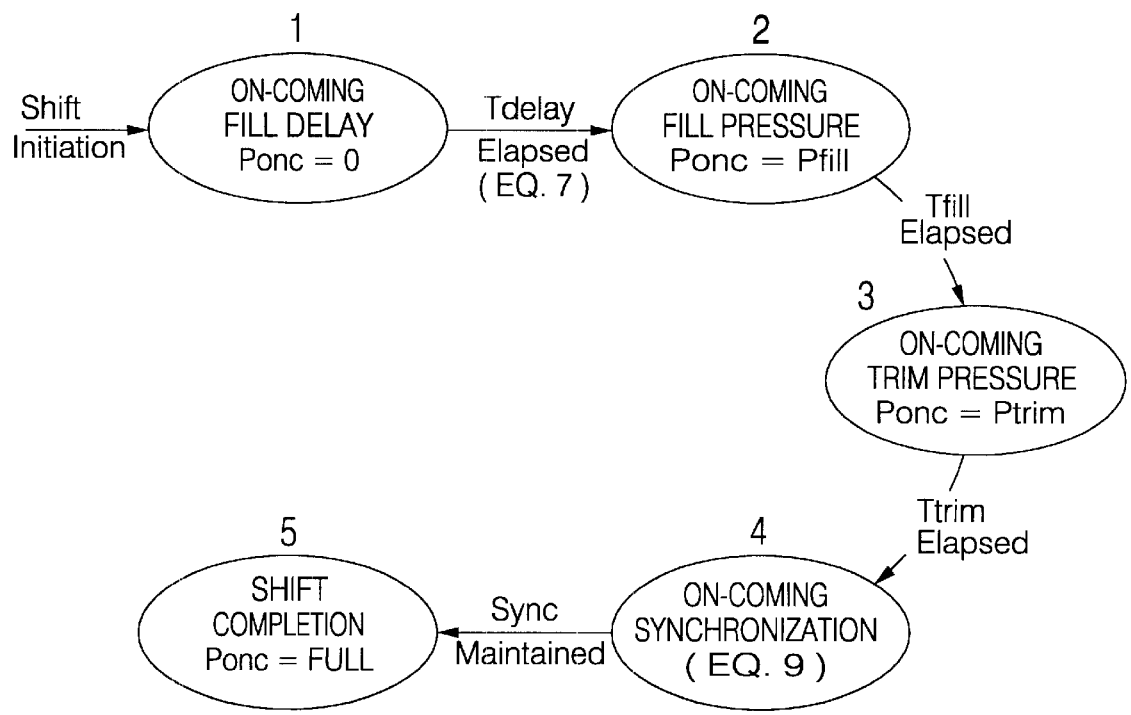
FIG. 6 is a state diagram illustrating an on-coming clutch pressure control according to this invention.

FIGS. 5 and 6 respectively depict the above-described off-going and on-coming pressure controls as a succession of states or phases. Referring to FIG. 5, the off-going control includes first, second, third, fourth and fifth states. The first state (off-going ramp) is entered at shift initiation, and is characterized by equation (2); the second state (off-going step) is entered on detection of off-going clutch slippage, and is characterized by the ΔPvalue of equation (5); the third state (off-going slipping) is entered on expiration of a hold period after the ΔP is activated, and is characterized by equation (6); the fourth state (off-going synchronization) is entered when TIS reaches SYNC, and is characterized by equation (10); and the fifth state (shift completion) is entered when TIS is substantially equal to SYNC for a calibrated period, and involves exhausting the off-going clutch. Referring to FIG. 6, the on-coming control also includes first, second, third, fourth and fifth states. The first state (oncoming fill delay) is entered at shift initiation, and involves a delay characterized by equation (7); the second state (on-coming fill pressure) is entered following the fill delay, and involves filling the on-coming clutch at Pfill for a predetermined period Tfill; the third state (on-coming trim) is entered following the fill period Tfill, and involves holding the pressure at a reduced value for a trim period Ttrim; the fourth state (on-coming synchronization) is entered when the estimated time to synchronization reaches a reference time, and is characterized by equation (9); and the fifth state (shift completion) is entered when TIS is substantially equal to SYNC for a calibrated period, and involves applying full pressure to the on-coming clutch.

In summary, the control of this invention uses a dynamic model of the transmission to schedule the on-coming and off-going clutch pressures in a power-on downshift based on the input torque and a desired input speed trajectory. As a result, the control responds appropriately to dynamic changes in input torque, the input speed more accurately tracks the desired trajectory, and the number of calibrated parameter requiring adaptive corrections are significantly reduced.

While described in reference to the illustrated embodiment, it will be understood that various modifications in addition to those mentioned above will occur to those skilled in the art. For example, the desired input acceleration may be scheduled as a function of time during the third state of the off-going clutch control, or alternately, the time Tshift may be specified instead of a constant desired acceleration. Additionally, various parameters, such as engine torque, vehicle loading, and the torque converter characterization may be determined by alternative methods than disclosed herein. Thus, it will be understood that controls incorporating these and other modifications may fall within the scope of this invention, which is defined by the appended claims.

What is claimed is:

1. A method of controlling on-coming and off-going pressures supplied to on-coming and off-going clutches in a vehicle automatic transmission to downshift the transmission from a current speed ratio to a target speed ratio, the transmission having an input shaft coupled to receive engine output torque, the method comprising the steps of:

using an inverse dynamic model of the transmission to determine an off-going pressure sufficient to balance the engine output torque in the current speed ratio, and progressively reducing the off-going pressure to said determined pressure;

once the off-going clutch begins to slip, using the inverse dynamic model of the transmission to estimate an off-going pressure for allowing the engine output torque to increase a speed of the input shaft toward a synchronous speed of the target speed ratio at a desired rate, and setting the off-going pressure in accordance with the estimated off-going pressure;

determining an on-coming pressure for balancing the engine output torque in the target speed ratio, and engaging the on-coming clutch at the determined on-coming pressure when the input shaft speed nears said synchronous speed;

controlling the on-coming and off-going pressures to maintain the input shaft speed at said synchronous speed; and raising the on-coming pressure and releasing the off-going pressure to complete the downshift after the input shaft speed has been maintained at said synchronous speed.

2. The method of claim 1, wherein the off-going pressure is progressively reduced upon initiation of the downshift so that the off-going pressure reaches the determined off-going pressure a predetermined time after the initiation of the downshift.

3. The method of claim 2, including the steps of:

detecting an initial slippage of the off-going clutch;

comparing a time of the detected initial slippage to said predetermined time; and adaptively adjusting the determined off-going pressure based on such comparison.

4. The method of claim 1, including the steps of:

detecting an error of the input shaft speed relative to said desired rate; and adjusting the estimated off-going clutch pressure based on the detected error.

5. The method of claim 1, including the steps of:

detecting an initial slippage of the off-going clutch; and adjusting the off-going pressure upon detection of said initial slippage based on a difference between the determined off-going pressure and the estimated off-going pressure.

6. The method of claim 5, wherein the off-going pressure is progressively reduced at a predetermined ramp rate prior to slippage of the off-going clutch, and the step of adjusting the off-going pressure upon detection of said initial slippage includes the step of:

adjusting the off-going pressure based on a product of said predetermined ramp rate and a predetermined hydraulic delay between commanding an off-going pressure and actually developing a corresponding pressure in said off-going clutch.

7. The method of claim 1, including the steps of:

setting the on-coming pressure to a fill pressure for a predetermined fill time to fill the on-coming clutch in preparation for its engagement; and reducing the on-coming pressure to a trim pressure sufficient to maintain the on-coming clutch in readiness for engagement for a predetermined trim time, such that the input speed nears the synchronous speed upon expiration of said predetermined trim time.

8. The method of claim 7, wherein the off-going pressure is progressively reduced upon initiation of the downshift so that the off-going pressure reaches said determined off-going pressure a predetermined ramp time after the initiation of the downshift, and the step of setting the on-coming pressure to the fill pressure is delayed for a delay interval based on said predetermined ramp time, the desired rate of said input speed, the predetermined fill time, and the predetermined trim time.

9. The method of claim 1, wherein the step of controlling the on-coming pressure to maintain the input speed at the synchronous speed includes the step of:

detecting when the input speed exceeds said synchronous speed; and in response to such detection, using the inverse dynamic model of the transmission to increase the on-coming pressure for achieving a desired pull-down rate of the input speed.

10. The method of claim 1, wherein the step of controlling the off-going pressure to maintain the input speed at the synchronous speed includes the step of:

detecting a speed error between said input speed and said synchronous speed; and adjusting the off-going pressure based on the detected speed error.

* * * * *